UNITED STATES PATENT OFFICE.

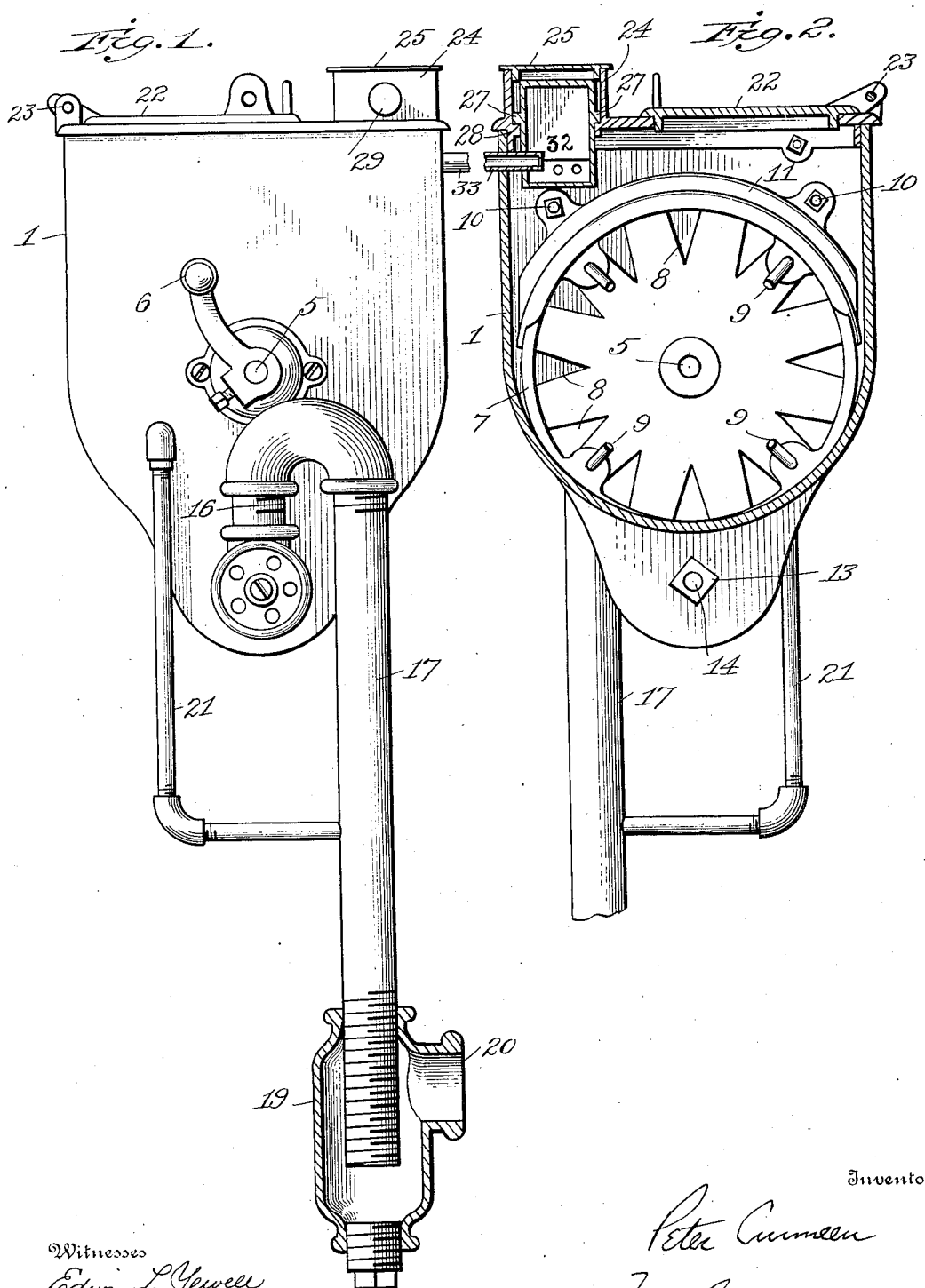

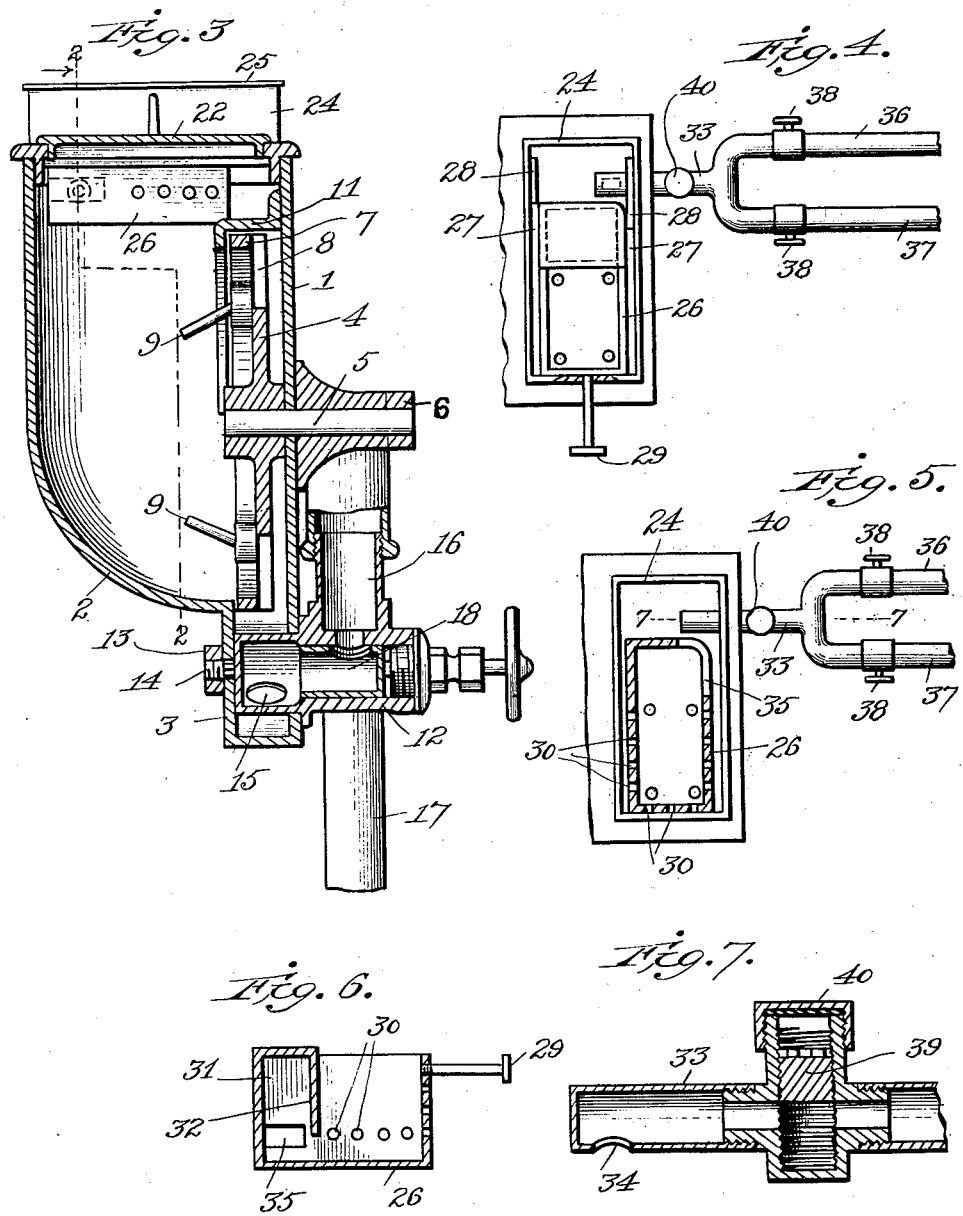

PETER CUNNEEN, OF NEW ROCHELLE, NEW YORK.

WASHING-MACHINE.

No. 856,229.      Specification of Letters Patent.      Patented June 11, 1907.

Application filed April 14, 1905. Renewed November 12, 1906. Serial No. 343,116.

*To all whom it may concern:*

Be it known that I, PETER CUNNEEN, a citizen of the United States, residing at New Rochelle, in the county of Westchester, State of New York, have invented new and useful Improvements in Washing-Machines, of which the following is a specification.

My invention relates to washing machines, and has for its object to provide certain improvements in the construction of the same as will be hereinafter more definitely pointed out and claimed, reference being had to the accompanying drawings, in which:

Figure 1 is a front elevation of the device, the discharge pipe connection being shown in section. Fig. 2 is a vertical longitudinal sectional view of the device on the line 2—2, Fig. 3, looking in the direction of the arrow. Fig. 3 is a central vertical transverse sectional view. Figs. 4, 5 and 6 are detail views of the soap box and water inlet, and Fig. 7, an enlarged detail sectional view of the water inlet pipe and its valve.

Similar numerals of reference denote corresponding parts in the several views.

In the said drawings the reference numeral 1 denotes a casing forming the tub, the same having its rear wall curved inwardly near its bottom at 2 to diminish the area of the same for a purpose hereinafter to be described. Below said curved portion 2 the tub is formed into a contracted chamber 3 to receive the soiled water whereby any sediment may be readily withdrawn in the manner hereinafter described.

Mounted vertically within the casing or tub 1 is a disk 4, supported by a suitable shaft 5, to which is attached an actuating handle 6. Said disk is provided with an integral rearwardly projecting flange 7 adapted to practically fill the space between said disk and the rear wall of the contracted chamber 3 of the casing or tub 1, as shown in Fig. 3, and is provided with a plurality of small apertures 8 for the free passage therethrough of the water. Fixed circumferentially in the rear face of said disk 4 near its edge is a series of pins 9, the same being inclined somewhat toward the center of said disk, as shown. Bolted to the front wall of the casing or tub 1 above said disk at 10 is a segmental guard plate 11.

Tapped into the front wall of the contracted chamber 3 of the casing or tub 1 is a pipe 12, the same being held in position by a nut 13 engaging the threaded end of an extension 14 of said pipe projecting through the rear wall of said contracted chamber 3. Said pipe 12 is provided with one or more apertures 15 in the under side of its inner end within the contracted chamber 3, and communicates with the short leg 16 of a siphon formed by said short leg and a long leg 17. I also prefer to provide said pipe 12 with a hand operated valve 18, for a purpose hereinafter to be described. The long leg 17 of the siphon leads into a trap 19, from whence there is a lateral discharge at 20 to the sewer. Tapped into the side of the long leg 17 of the siphon is a vent or relief pipe 21 leading therefrom and communicating at its other end with the casing or tub 1 a little below its horizontal center, as shown in Fig. 1.

The casing or tub 1 is provided with a cover 22 hinged thereto at 23, and at one side of its top is projected into a chamber 24, provided with a removable cover 25, and adapted to receive therein a soap box 26, the latter being somewhat shorter than said chamber 24, as seen in Figs. 4 and 5, and having side projections 27 resting on ways 28, whereby it is longitudinally movable in said chamber 24, a handle 29 projecting through the end thereof and attached to said soap box, affording a means for moving said soap box. The soap box 26 is numerously apertured at 30, and is formed at the end opposite the handle 29 into a separate chamber 31 closed at its top, but having the partition 32 separating it from the main portion of the soap box 26 terminating above the bottom of said soap box, so that there is free communication between the two, as seen in Fig. 6.

Projected through the side of the casing or tub 1 and into the path of movement of the soap box 26 is a water supply pipe 33, the same being closed at its end, but having an opening 34 in its under side immediately adjoining said end for the escape of the water. The chamber 31 of the soap box 26 is provided in its corner adjacent to said pipe 33 with an aperture 35, into which the end of said pipe 33 is adapted to pass when said soap box is moved toward said pipe, so that, when said soap box is moved to its extreme distance in that direction, said pipe 33 will lie within and discharge into the chamber 31 thereof, whereas, when said soap box is moved to its limit in the opposite direction, said pipe 33 will lie without said chamber and will discharge directly into the casing or tub 1, as seen in Figs. 4 and 5. Connected to said pipe 33 are two pipes 36 and 37, for hot and cold water, respectively, each being provided with a cut-off valve 38, while in said pipe 33 is a separate cut-off valve 39 and cap 40 for a purpose hereinafter to be described.

From the above description the operation of my improved construction will be understood to be as follows: The valve 39 being adjusted to admit a proper quantity of water, either or both of the valves 38 are opened as desired to admit the water, and the soap box 26 being charged with soap and adjusted so that the pipe 33 lies within the chamber 31 thereof, the water will be discharged thereinto and passing freely under partition 32 thereof will take up the soap and be then discharged through the apertures 30 into the casing or tub 1, the function of chamber 31 being to prevent any splashing of the water, due to rapid discharge through pipe 33. The casing or tub 1 being charged with the articles to be washed and the disk 4 rotated, through handle 6, will cause the pins 9 thereon to take up said articles, this being facilitated by the upward inclination of said pins while at the bottom of said disk, as well as by the inward curvature 2 of the rear wall, the latter throwing said articles directly on said pins, while the flange 7 on said disk effectually prevents even small articles from passing into chamber 3 beneath. Now, as said pins carry the articles upward, their angle gradually changes from upward to downward, thus releasing said articles and permitting them to drop onto the underlying pins to be again raised and agitated. The function of the guard plate 11 is to prevent the articles from falling behind the disk 4, while the apertures 8 in said disk permit a free circulation of the water therethrough. While this agitation of the articles is occurring the soapy water discharged from the soap box 26 accumulates in the casing or tub 1 until it sets in operation the siphon formed by the legs 16 and 17 of the discharge, which has been found in practice to occur when the casing or tub becomes about two-thirds full of water, whereupon said siphon will operate to exhaust the water until the apertures 15 in pipe 12 are uncovered and the siphon thereby broken, this operation proceeding and the casing or tub 1 alternately filling and emptying so long as water is admitted thereto. I have found in practice that the vent or relief pipe 21 is very efficient in connection with the siphoning action, the same preventing the siphoning action from beginning as soon as the water reaches the level of the top of the siphon, by reason of its discharge into the long leg or pipe 17 of said siphon tending to fill said leg or pipe below said point, thus trapping the air in said leg or pipe above said discharge point, and retarding the siphoning action until the pressure of water overcomes the same, which has been found in practice to occur when the casing 1 is about two-thirds full of water. Now, when the articles in the casing or tub 1 have been washed sufficiently to remove all unclean matter, and it is desired to rinse them with clear water, the soap box 26 is shifted by its handle 29 to uncover pipe 33, as shown in Figs. 4 and 5, whereupon the water therefrom will discharge directly into casing or tub 1 without passing through the soap box, and by continuing the agitation of the articles an effectual rinsing of the same is accomplished, it being understood that the siphoning action still continues, whereby the articles are subjected to the action of clear, fresh water, which may be made hot, cold or tepid, as desired, by manipulating valves 38.

It will be observed in the vertical sectional view shown in Fig. 3 that but one aperture 15 is shown in the pipe 12, the same being located a little above the underside of said pipe and in one side thereof, but it will be understood that I prefer to provide said pipe 12 with a similar aperture in the other side, which necessarily would not show in a sectional view.

I have provided the valve 39 in inlet pipe 33, in addition to the valves 38, because of the fact that the water pressure varies in different localities. It is intended that said valve 39 shall be adjusted once for all by an experienced operator to suit the water pressure at the point where the particular device is to be operated, and the cap 40 screwed into position, which will render tampering with the same difficult. Then the inexperienced manipulator of the device will be instructed to open valves 38 to their fullest extent when operating the device, and the initial adjustment of valve 39 will so control the water supply as to obtain a proper siphoning action.

The valve 18 in pipe 12 is provided to cut off the water discharge should it be desired to retain the casing or tub 1 full of water when but slightly soiled articles are to be washed.

Having thus described my invention, what I claim as new and desire to secure by Letters Patent is:

1. In a washing machine, a casing or tub, a water supply thereto, and means for charging said water supply with a cleansing medium, or for causing said water to be discharged into said tub uncharged with said cleansing medium.

2. In a washing apparatus, a casing or tub, a water supply thereto, and a chamber intermediate said water supply and tub adapted to contain a cleansing medium, said water supply and chamber being adjustable relatively either to discharge the water through said chamber in its passage to the tub or to permit the water to discharge directly into said tub.

3. In a washing machine, a casing or tub, a water supply pipe projecting thereinto, and a chamber in said tub adapted to contain a cleansing medium, and adjustable either to encompass the discharge end of said pipe or to uncover said discharge end to permit the latter to discharge directly into said tub.

4. In a washing machine, a casing or tub, a water supply pipe projected thereinto, and a chamber adapted to contain a cleansing medium, and movable in said tub, said pipe lying in the path of movement of said chamber, and said chamber being apertured to receive and encompass the discharge end of said pipe when in one position, and to uncover said discharge end when in its opposite position.

5. In a washing machine, a casing or tub, a water supply pipe projected thereinto, a box or chamber adapted to contain a cleansing medium, intermediate said pipe and said casing or tub, and an auxiliary chamber in said box or chamber adapted to receive the discharge of water from said pipe, said auxiliary chamber being formed to check the force of the flow of the water thereinto and to permit its passage into said box or chamber.

6. In a washing machine, a casing or tub having one vertical wall thereof curved inward at its base, a rotatable disk mounted vertically in said casing or tub and flanged peripherally toward said curved wall to form in conjunction with the lower edge of the latter a substantial closure, and means projecting from the vertical face of said disk to engage and agitate the articles within said casing or tub.

7. In a washing machine, a casing or tub merging into a contracted lower end, a discharge pipe communicating with said contracted lower end, and a rotatable disk mounted in said casing or tub and forming in conjunction with one wall of said casing or tub a substantial closure to prevent access of articles being washed to said contracted lower end.

8. In a washing machine, a casing or tub, means for affording a continuous supply of water thereto, a siphon connected with the lower end of said casing or tub for intermittently and automatically exhausting the water therefrom, and a vent or relief pipe connecting the long leg of the siphon with the casing or tub intermediate the height of the latter.

In testimony whereof, I have hereunto set my hand in the presence of two subscribing witnesses.

PETER CUNNEEN.

Witnesses:
PERCY B. HILLS,
EDWIN L. YEWELL.